US010372015B2

(12) United States Patent
Awschalom et al.

(10) Patent No.: US 10,372,015 B2
(45) Date of Patent: Aug. 6, 2019

(54) SEMICONDUCTOR SYSTEM WITH TRANSITIONAL METAL IMPURITY FOR QUANTUM INFORMATION PROCESSING

(71) Applicant: The University of Chicago, Chicago, IL (US)

(72) Inventors: David Awschalom, Chicago, IL (US); Berk Diler, Chicago, IL (US); William Koehl, Chicago, IL (US); Samuel James Whiteley, Chicago, IL (US)

(73) Assignee: The University of Chicago, Chicago, IL (US)

( * ) Notice: Subject to any disclaimer, the term of this patent is extended or adjusted under 35 U.S.C. 154(b) by 235 days.

(21) Appl. No.: 15/457,619

(22) Filed: Mar. 13, 2017

(65) Prior Publication Data

US 2017/0261835 A1 Sep. 14, 2017

Related U.S. Application Data

(60) Provisional application No. 62/307,990, filed on Mar. 14, 2016.

(51) Int. Cl.

| | |
|---|---|
| ***G02F 3/00*** | (2006.01) |
| ***G02F 1/00*** | (2006.01) |
| ***G06N 99/00*** | (2019.01) |
| *B82Y 10/00* | (2011.01) |
| *B82Y 20/00* | (2011.01) |

(52) U.S. Cl.

CPC .............. *G02F 3/00* (2013.01); *G02F 1/0054* (2013.01); *G06N 99/002* (2013.01); *B82Y 10/00* (2013.01); *B82Y 20/00* (2013.01); *G02F 2202/10* (2013.01); *G02F 2202/32* (2013.01); *G02F 2203/15* (2013.01); *G02F 2203/16* (2013.01); *Y10S 977/933* (2013.01)

(58) Field of Classification Search

CPC ........ G02F 1/0054; G02F 3/00; G06N 99/002

See application file for complete search history.

(56) References Cited

U.S. PATENT DOCUMENTS

| | | | | |
|---|---|---|---|---|
| 2018/0090200 | A1* | 3/2018 | Soykal .................... | G11C 11/44 |
| 2018/0330266 | A1* | 11/2018 | Simmons .................. | B82B 3/00 |

OTHER PUBLICATIONS

Chemistry of Silicon LibreTexts, https://chem.libretexts.org/Textbook_Maps/Inorganic_Chemistry/Supplemental_Modules_(Inorganic_Chemistry)/Descriptive_Chemistry/Elements_Organized_by_Block/2_p-Block_Elements/Group_14%3A_The_Carbon_Family/Z%3D014_Chemistry_of_Silicon_(Z%3D14) (Year: 2018).*

Wesenberg, Janus, "Quantum Information Processing in Rare-Earth-Ion-Doped Crystals," Ph.D. Thesis. http://phys.au.dk/fileadmin/site_files/publikationer/phd/Janus_Wesenberg.pdf (Year: 2004).*

* cited by examiner

*Primary Examiner* — Matthew L Reames

(74) *Attorney, Agent, or Firm* — Brinks Gilson & Lione

(57) ABSTRACT

Methods and devices are disclosed for implementing quantum information processing based on electron spins in semiconductor and transition metal compositions. The transition metal electron orbitals split under semiconductor crystal field. The electron ground states are used as qubits. The transitions between the ground states involve electron spin flip. The semiconductor and transition metal compositions may be further included in optical cavities to facilitate quantum information processing. Quantum logic operations may be performed using single color or two color coherent resonant optical excitations via an excited electron state.

24 Claims, 23 Drawing Sheets

SEMICONDUCTOR SYSTEM WITH TRANSITIONAL METAL IMPURITY FOR QUANTUM INFORMATION PROCESSING

REFERENCE TO RELATED APPLICATION

This application claims the benefit of U.S. Provisional Patent Application No. 62/307,990, filed on Mar. 14, 2016, which is hereby incorporated by reference herein in its entirety.

BACKGROUND

Quantum information processing may be based on localized electron spins. In particular, quantum information devices may be based on electron spins to perform quantum logic operations or store quantum information.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention.

DETAILED DESCRIPTION

Figure 1:
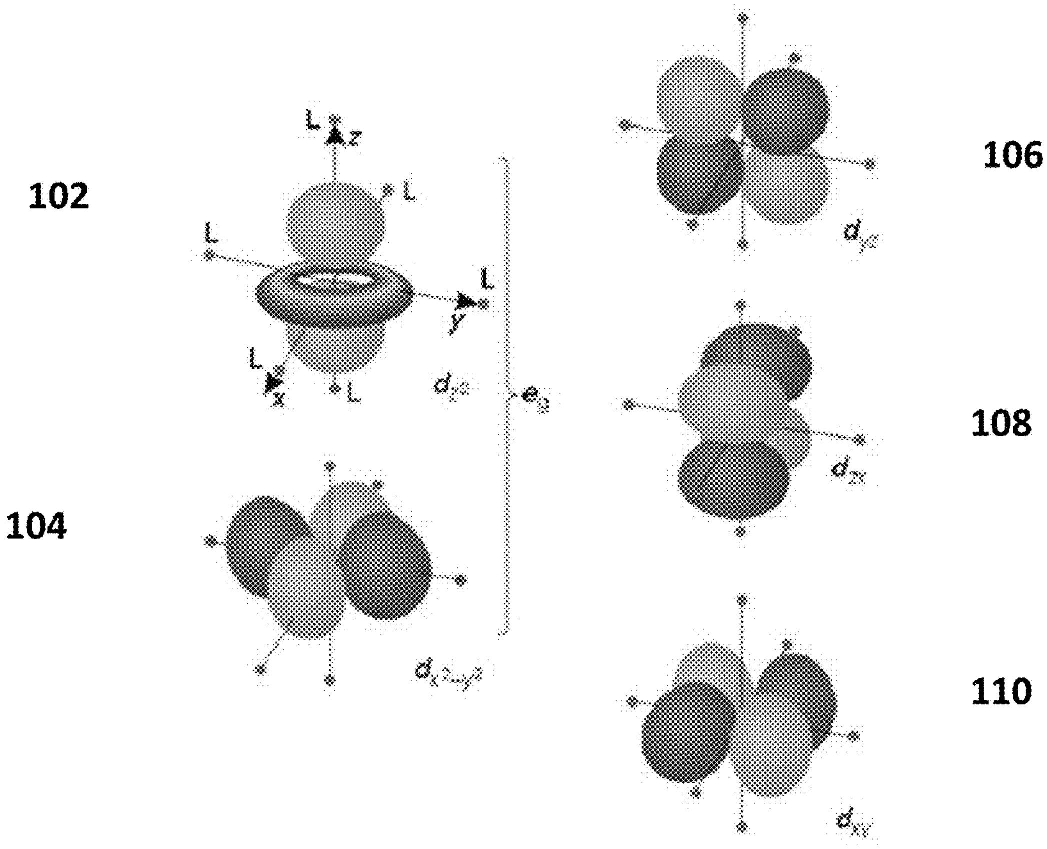
FIG. 1 illustrates d electron orbital wave function envelopes of transition metal ions.

Embodiments of the invention and the various features and advantageous details thereof are explained more fully with reference to the nonlimiting embodiments that are illustrated in the accompanying drawings and detailed in the following description. Descriptions of well-known starting materials, processing techniques, components and equipment are omitted, so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

By way of introduction, quantum information processing takes advantages of quantum parallelism, quantum entanglement, and quantum no-cloning principles, and may markedly improve computation speed for certain practical applications and enhance communication security. In one implementation, quantum information processing is based on a set of fundamental operations on quantum states forming a set of quantum bits (qubits) analogous to conventional classical bits except that each qubit may be prepared or manipulated in any coherent superposition of logic "0" and logic "1" as opposed to binary "0" or "1" in classical information processing. A quantum logic operation of any complexity may be decomposed into a sequence of operations each from a set of fundamental quantum gates, analogous to a minimum set of classical logic operations used to implement any classical logic operation. One example of a fundamental quantum logic gate comprises a quantum controlled-not gate, analogous to the exclusive-or gate in classical binary computation.

Various physical systems may provide quantum states used to implement quantum logic operations and provide a methodology for measuring the resulting quantum states. In one implementation, a quantum system is described by a quantum wave function comprising amplitudes representing a probability of finding the quantum system in a particular quantum state and quantum phases which represent relative coordination between quantum states. The quantum wave function, and in particular the quantum phases, are fragile in that it may easily be disturbed by the environment. Such environmental disturbance decoheres the quantum system, potentially beyond the extent of available quantum error correction schemes, thereby resulting in the quantum information coded in quantum wave functions being irreversibly lost.

Quantum information processing may be implemented, for example, in a device that contains controllable electron spins. Electron spin states are typically more robust than other types of quantum states because the spin degree of freedom of electrons is coupled less to the environment. In this regard, coherence among spin states may be maintained for a period of time long enough for a sequence of quantum operations to be conducted. In one implementation, the term environment refers to the surroundings of an electron, and may include the ions and other electrons that may interact with the electron spin. Single electron spin has two quantum states denoted by $|\uparrow>$ and $|\downarrow>$, or spin-up and spin-down states. As a qubit, the spin-up state and spin-down state may be the logic "0" and logic "1" states, respectively. Alternatively, the spin-up and spin-down state may be the logic "1" and logic "0" states, respectively. Alternatively, quantum information processing may use multi-electron spin states. For example, a two electron complex may provide spin singlet states and spin triplet states, a total of four states. Specifically, the spin singlet states in two-electron basis can be $1/\sqrt{2}(|\downarrow\uparrow>-|\uparrow\downarrow>)$. The spin triplet states may be $|\uparrow\uparrow>$, $1/\sqrt{2}(|\downarrow\uparrow>+|\uparrow\downarrow>)$, and $|\downarrow\downarrow>$. A two electron system may be used as a single qubit, where two of the four states, or two superposition states of the four base states may be used to represent logic "0" and logic "1". Other multi-electron spin states are contemplated. Spin degree of freedom may be coupled to the electron orbital states. The orbital states describe the orbitals of electron motion around its ion core.

For scalable quantum information processing devices, the electron spins may be placed in a solid state host in one implementation. Semiconductors, such as silicon, silicon carbide (SiC), gallium nitride (GaN), and gallium arsenide (GaAs), as a foundation for today's electronics and optoelectronics, are feasible hosts for electron spin systems because of their strong industrial manufacturing basis. Localized electrons may be introduced into semiconductor hosts by substituting host lattice sites with impurity ions via doping. The localized electrons around the impurity ions may provide the necessary electronic property that enables quantum information processing based on electron spins. The doping of semiconductor may be accomplished via various means. For example, doping may be achieved via an introduction of impurity ions during semiconductor growth process such as chemical vapor deposition and molecular beam epitaxy. Doping may alternatively be achieved via impurity ion implantation after the growth of the semiconductor material, with the implanted impurity ions naturally falling into semiconductor crystal sites following techniques such as annealing.

In one embodiment, a semiconductor host may be doped with a transition metal ion so that the transition metal ions substitute at a plurality of crystal sites of the semiconductor host. The transition metal ion may have a d2 electron configuration. It may have a d8 electron configuration. Transition metal ions with other d-N (where N is an integer number) electron configuration are contemplated as well. The metal ion may comprise one, or any combination of chromium, vanadium, niobium, and tantalum. Other metal ions are contemplated. For example, a transition metal ion such as a chromium ion has two outer shell electrons occupying d orbitals when it is in the +4 charge state. For free ions such as chromium, there are 5 degenerate orbital states that the two electrons may occupy. The 5 orbital wave function envelopes are illustrated in FIG. 1, labeled as 102, 104, 106, 108 and 110. The states are degenerate in energy, meaning that a single electron would be at the same energy when occupying any of these 5 orbitals.

Figure 2A:
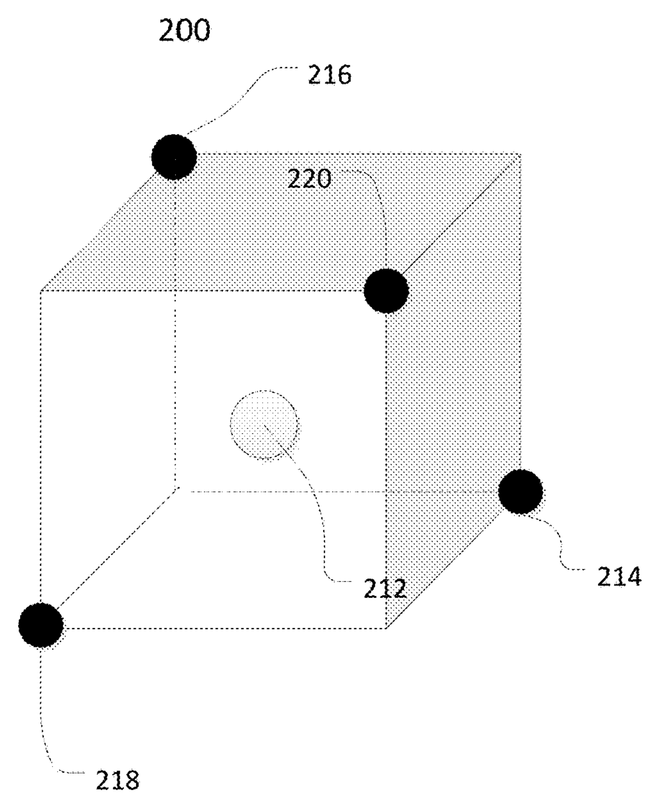
FIG. 2A illustrates a composition having a transition metal ion and a tetrahedral crystal host.
Figure 2B:
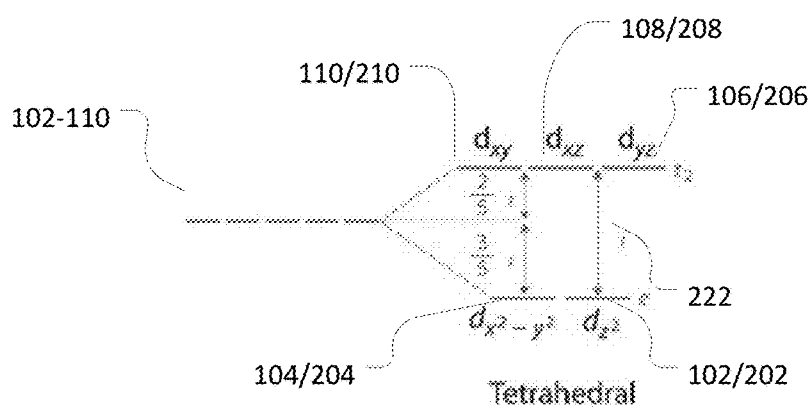
FIG. 2B illustrates the orbital splitting of a transition metal ion under a tetrahedral crystal field.

In a specific embodiment as shown in FIG. 2A, chromium ions may be doped into a tetrahedral semiconductor host such as SiC or GaN, forming a composition 200. SiC will be referred to hereinafter as a representative example. Other semiconductors hosts, including those with coordination geometries, such as octahedral semiconductor hosts, are contemplated. The nearest neighbors of a chromium ion 212 are the 4 silicon or carbon ions 214, 216, 218, and 220. These ions will strongly interact with the electron localized around the chromium ion via the Coulomb force. The Coulomb force field exerted on the localized chromium electrons may be referred to as crystal field. The strength of the Coulomb interaction depends on the spatial orientation and shape of the electron orbitals. Because each of the 5 Chromium d orbitals are orientated and shaped in the ways illustrated in FIG. 1, they will generally split in energy into two groups under the crystal field, as illustrated in FIG. 2B. The first group, including the orbitals labeled as 102 and 104 in FIG. 1, will have lower energy. The second group, including the orbitals labeled as 106, 108, and 110, will have higher energy due to the greater interactions they experience from the Coulomb force field of the surrounding ions.

Such splitting of the orbital energy levels as a result of strong crystal field may be advantageous for quantum information manipulation based on these systems. In the particular example illustrated in FIGS. 1 and 2A-B, such splitting may shift three orbital levels far away from the two lower orbital states. In this way, quantum information operation based on the spin of electrons occupying these two lower orbitals may not be contaminated by the higher orbital states, particularly when coherent optical excitation is used as a means for quantum information operation, as discussed in more detail below. The energy splitting between these two groups of orbitals is illustrated by 222 of FIG. 2B.

Figure 3A:
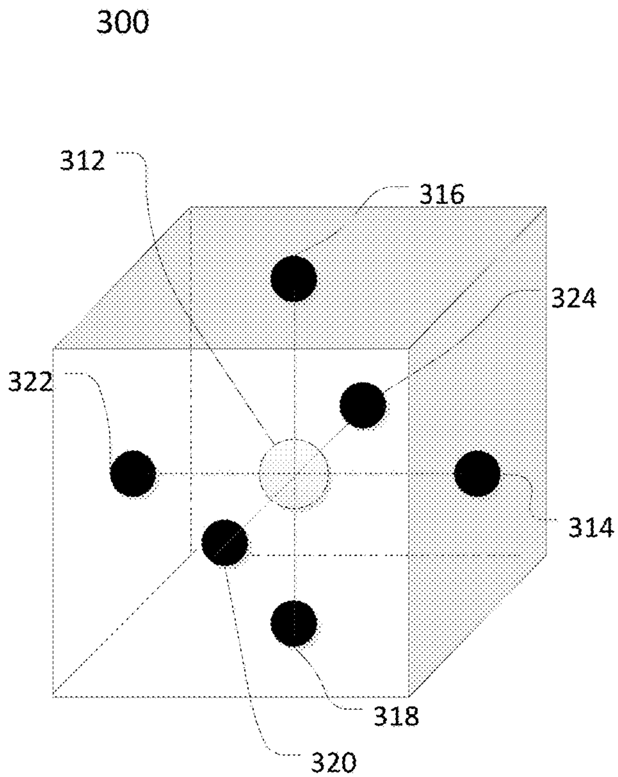
FIG. 3A illustrates a composition having a transition metal ion and an octahedral crystal host.

FIG. 3A illustrates another specific embodiment where transition metal ions such as nickel ions are doped into an octahedral crystal host. In FIG. 3A, the nickel ion 312 is surrounded by 6 nearest neighboring semiconductor ions 314, 316, 318, 320, 322, and 324. Again, because of the specific spatial relationship between the semiconductor host and the chromium orbitals, the 5 orbital will split under the crystal field, again into two groups, except the lower energy orbitals are 306 and 308 and 310 (corresponding to 106, 108, and 110 of FIG. 1), and the higher energy orbitals are 302 and 304 (corresponding to 102 and 104 of FIG. 1). The energy splitting of these two groups of orbitals is shown by 326.

Figure 3B:
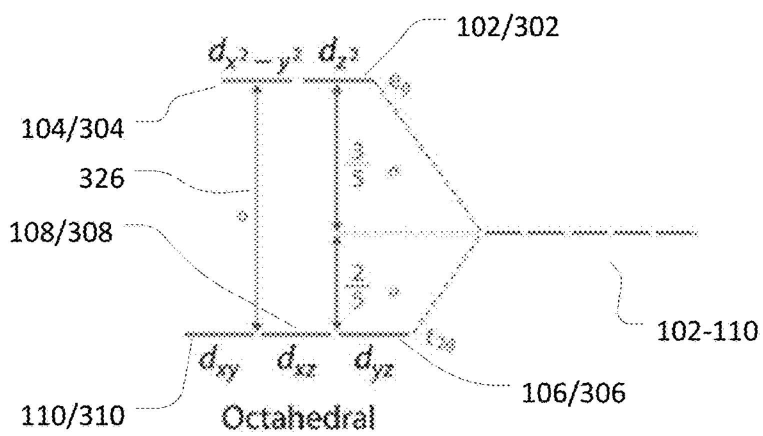
FIG. 3B illustrates the orbital splitting of a transition metal ion under an octahedral crystal field.

The tetrahedral and octahedral semiconductor crystal hosts are mere examples of a general family of multi-hedral crystals based on various cubic crystal configurations having multi-hedral coordination geometry determined by the positions of crystal sites on the cubit vertices and faces. The crystal field in multi-hedral semiconductor crystals other than tetrahedral and octahedral crystals may provide orbital splitting for transition metal ions different from FIG. 2B and FIG. 3B. However, the principles discussed herein applies.

Because the materials depicted in FIGS. 2A and 3A provide a large orbital splitting 222 and 326 (shown in FIGS.

2B and 3B), in one implementation, the higher energy orbitals may be ignored for quantum information processing based on the spin states of electrons occupying the lower energy orbitals. The discussion below will thus focus on the lower energy orbitals. In particular, without losing generality, embodiments below will be based on tetrahedral semiconductor host of FIG. 2A, where two orbitals are of lower energy under the crystal field splitting. However, using other energy orbitals for quantum information processing is contemplated.

For chromium ion in a tetrahedral crystal with a 4+ charge state, the two chromium d electrons will occupy the two lower orbitals under the Pauli exclusion principle, with each orbital being occupied by at most two electrons with opposite spins. When the two electrons do occupy the same one of the two lower orbitals, they are in spin singlet state and occupy the same orbital (either one of the two orbitals), or some superposition of these doubly-occupied orbitals. However, when the two electrons each occupy a separate orbital state, they may have the same spin and thus may be in one of or a superposition of the spin triplet states.

Figure 4A:
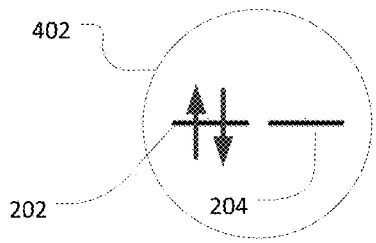
FIGS. 4A-4E illustrate the electron configurations of the two lower orbitals of a transition metal ion under a tetrahedral crystal field.
Figure 4B:
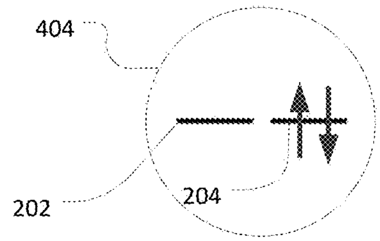

Because of electron-electron interaction, when the two electrons are in the same orbital this leads to an increase in electron orbital energy. This is due to the closer spatial proximity of the two electrons when they are in the same orbital, the electron-electron repulsive Coulomb interaction, and modifications to the quantum-mechanical exchange interaction. When the two electrons occupy separate orbitals, they are not as close spatially and thus the Coulomb interaction between them is weaker, resulting in the two electrons being lower in energy. Additionally, the quantum-mechanical exchange interaction will lower the energy when the two spins are parallel. FIGS. 4A-4B illustrate the energy levels under the two electron basis, and in particular, illustrate the configuration where the two electrons both occupy a single orbit but with opposite spins. These two configurations have higher energy levels due to stronger electron-electron interaction and quantum mechanical exchange interaction effects. The electrons may occupy either one of the orbitals 202 and 204. These energy levels under the two-electron basis are shown as 402 and 404 in FIG. 4F. Each of 402 and 404 in FIG. 4F thus represents energy level of one of the two possible two-electron configurations for the two electrons to occupy a single one of the two orbitals. Because of the Pauli exclusion principle, the two electrons simultaneously occupying either of the 210 or 212 are in spin singlet state. Level 402 and 404 of FIG. 4F thus represents energy levels of two states that are orbit doublet and spin singlet.

Figure 4C:
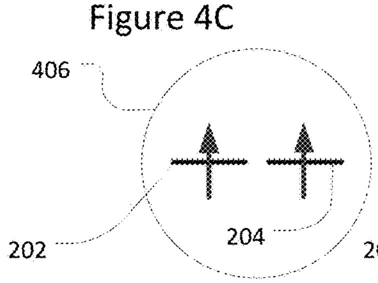
Figure 4D:
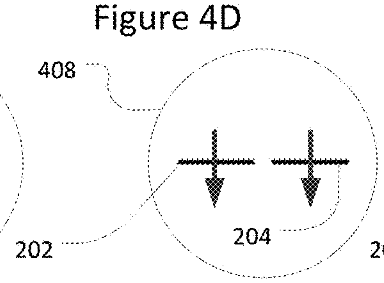
Figure 4E:
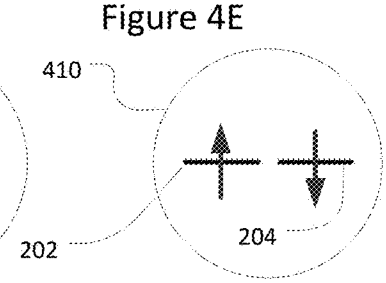
Figure 4F:
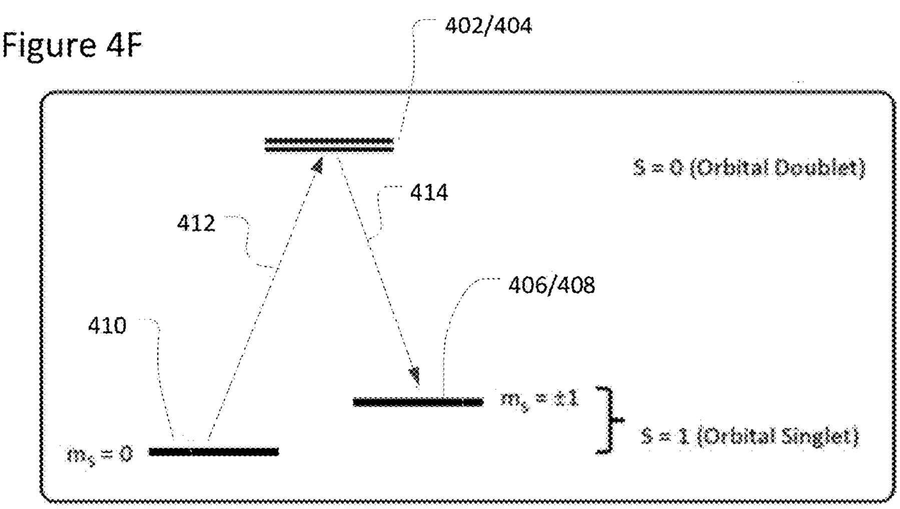
FIG. 4F illustrates an energy level diagram of the lowest electron states of a transition metal ion under a tetrahedral crystal field.

FIGS. 4C, 4D, and 4E illustrate electron configurations where each electron occupies separate one of the two orbitals 202 and 204. The energy levels of these configurations are represented by 406, 408, and 410 of FIG. 4F. There is only a single possible orbital configuration but the spin of the two electrons may be in triplet states without violating the Pauli exclusion principle. Thus, levels 406, 408 and 410 represent the three spin sublevel energy levels of the spin triplet within the orbital singlet. The three levels 406, 408 and 410, respectively, correspond to quantum states of two electrons possessing a spin quantum number of $m_s=+1$, $-1$, and 0. The $m_s=0$, and $m_s=\pm1$ levels may further split under spin-spin and spin-orbital coupling interaction, as shown in FIG. 4F. In addition, the $m_s=\pm1$ levels may be further split under a static magnetic field by Zeeman splitting.

Thus, the embodiment of FIG. 2A provides a strong splitting of the chromium d orbitals. The two lower d orbitals, when filled with two electrons, provide an energy level diagram as shown in FIG. 4F. The energy splitting between the orbital doublet/spin singlet (402 and 404) and the orbital singlet/spin triplet (406-410) is herein referred to as spin pairing energy, which is Coulombic in nature. As explained above, the spin pairing energy is related to spin in that orbital occupancy of the two electrons (which determines the amount of electron-electron Coulomb interaction and the quantum-mechanical exchange interaction energy) is limited by the spin state of the two electrons.

In one implementation, the spin pairing energy may be in the optical range, e.g. in the near-IR spectral range That is, transition between the orbital singlet/spin triplet states (hereinafter referred to as "ground states") and the orbital doublet/spin singlet states (hereinafter referred to as "excited states") may be induced by electromagnetic wave in the spectrum range of light. Thus, coherent lasers may be used to induce transitions between the ground states and excited states for carrying out quantum logic operations. The spin system discussed above may be an emitter (e.g., in the near-IR spectral range) which possesses exceptionally weak phonon sidebands and may ensure that most of the overall optical emission is contained with the defect's zero-phonon line (ZPL).

The embodiment of FIG. 2A thus provides a system with an energy level diagram of a lambda system, as shown in FIG. 4F. The ground states (406-410) can be used as the qubit and the manipulation between these states, e.g., coherently pumping from one ground state to another and creating coherent superposition of the ground states, can be conveniently achieved by using laser pulses tuned to the spin pairing energy. In that way, the excited states (402-404) may be used as intermediate levels to achieve transition among the ground states which would otherwise only be done in the microwave spectral range. Using laser pulses to perform quantum logic operations is advantageous due to the maturity in laser pulse generation and control technologies. In addition, the spin pairing energy may correspond to an optical frequency that is within the optical fiber transmission range and that optical fiber may be conveniently used to carry the laser to a spin based quantum logic device for performing quantum logic operations, or to optically transmit quantum information between two spin based logic devices.

For example, a laser field may be tuned to be resonant with the transition between 410 and 402/404, as shown by 412 of FIG. 4F. Such a transition involves going from the two-electron configuration of 410 to 402/404 of FIG. 4A-D and thus involve an excitation of one electron from one orbital to another orbital without a spin flip, but with a change in overall spin, $\Delta S=-1$. Another laser field may be tuned to drive from the excited state 402/404 to the other ground states 406/408 of FIG. 4F. This transition involves going from the two-electron configuration of 402/404 to 406/408 of FIG. 4A-D and thus involves taking one electron from the orbital shared with the other electron to the other orbital while flipping the spin, again with a non-zero change in overall spin of $\Delta=1$. Thus, by using laser pulses, the transition between the ground states involving only a single or two spin flips without any orbital change is achieved. Coherence of the system is maintained by using coherent laser pulses. The ground states are stable and have no other states to relax to. Thus, the embodiment of FIG. 2A and the corresponding level diagram of FIG. 4F in the two electron basis may be used for quantum logic operation.

Additionally, the embodiment of FIG. 2A may exhibit narrow ensemble optical linewidth for the optical transition 412 and 414 in FIG. 4F. The optical transition linewidth may be on the order of 10 GHz or lower. Such narrow linewidth may allow for separately addressing the magnetic sublevels (ground states 410, and 406/408 of FIG. 4F). The resonance energy of 410 and 406/408 to the excited state may be split using a magnetic field, thereby allowing for little cross talk when a laser is used to optically excite any of these three states. In other words, because the optical transition linewidth is narrow and the magnetic sublevels can be split by magnetic field, one ground state can be optically addressed individually without inference from other ground states.

The splitting between the three other orbitals (206-210 of FIG. 2B) and the two orbitals discussed above (202 and 204 of FIG. 2B) is preferably larger than the spin pairing energy (e.g., the splitting between the ground states and excited states discussed above). A large splitting ensures that the laser pulses used to perform quantum logic operations between the ground states via the excited states will not be in near resonance with these other 3 orbital states and the electrons will not be excited into those orbitals. The tetrahedral host of FIG. 2A provides a crystal configuration and a large crystal field acting on the chromium electrons to achieve such a large splitting.

As discussed above, SiC or GaN may be used. Alternatively, other materials are contemplated. In this regard, the principle discussed above may be applicable to other materials. In particular, materials may be used as long as the splitting as a result of the crystal field in a respective material is sufficiently large such that the orbital splitting is sufficiently greater than the spin pairing energy. In this way, the crystal may have different coordination geometries, such as, for example, octahedral. As examples, material composition of 200 or 300 of FIG. 2A and FIG. 3A may be any one or any combination of chromium, vanadium, tantalum, niobium, molybdenum, tungsten, Zirconium, and Hafnium in SiC, GaN, aluminum nitride, gallium arsenide, zinc oxide, zinc sulfide, zinc selenide, or silicon crystal host.

Figure 5:
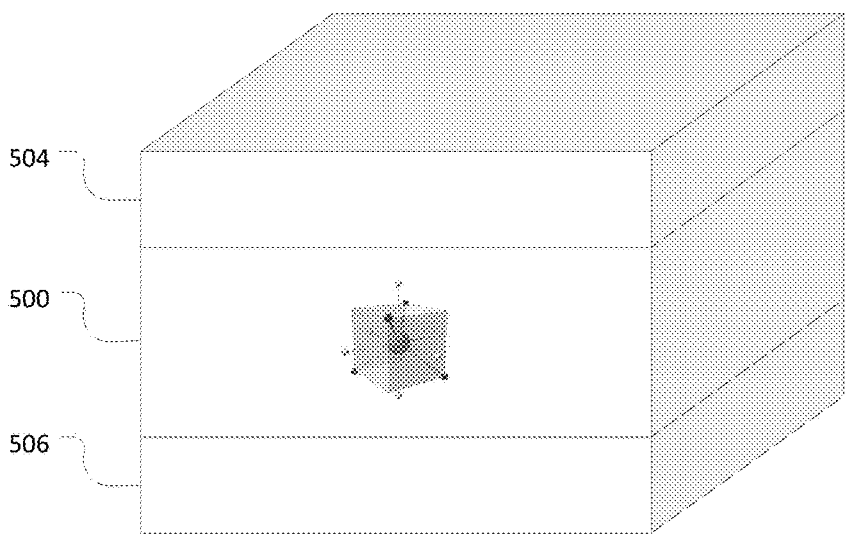
FIG. 5 illustrates one example of an optical quantum logic device comprising a transition metal ion and semiconductor host composition.
Figure 6:
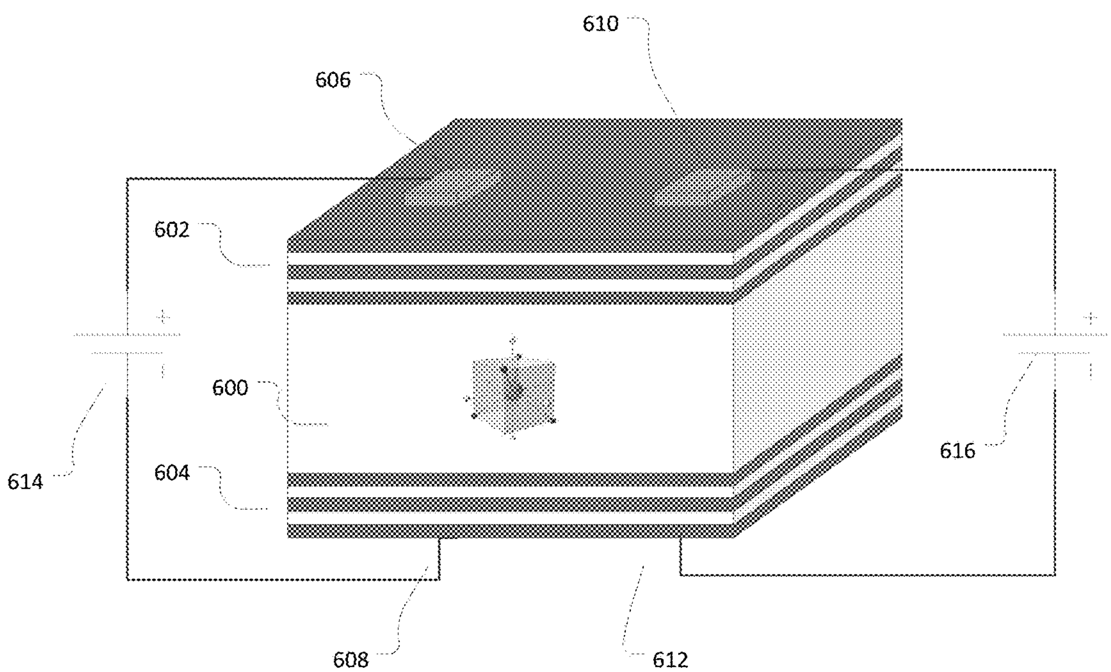
FIG. 6 illustrates another example of an optical quantum logic device comprising a transition metal and semiconductor host composition.

In another embodiment, as shown in FIG. 5, the composition of metal ions and semiconductor host described above, shown as 500, may be placed in optical elements or other additional electric elements such as 504 and 506 for facilitating quantum logic operations. A particular example is shown in FIG. 6. In FIG. 6, optical elements 602 and 604 are a pair of Bragg reflectors that forms an optical cavity enclosing the composition 600. Additional pairs of electrodes, (606, 608) and (610, 612), may be placed on the Bragg reflector or alternatively embedded into the Bragg reflectors and directly on top and bottom of composition 600. These pairs of electrodes may be connected to power supplies 614 and 616.

The optical cavity formed by the Bragg reflectors 602 and 604 may confine light in the cavity, with the cavity having defined cavity modes. The optical cavity modes may be periodically spaced in optical frequency. The Bragg reflectors 602 and 604 may each comprise multiple layers of periodic dielectric materials with alternating optical refractive index near the optical frequency corresponding to the spin pairing energy of the outer shell electrons of the metal ions in the composition 600. The cavity mode is determined at least by the distance between the pair of Bragg reflectors and the optical index of fraction of composition 600. Those of ordinary skill in the art understand that the periodicity of the Bragg reflector 602 and 604 may be designed such that they reflect light near the ground-excited states resonance with high reflection coefficient. The optical cavity may be fabricated to have a high quality factor and thus capable of confining light for a long period of time.

The electrodes 606-612 may be used to tune the cavity mode by applying an external electric field to induce refractive index change in the composition 600. The tuning of the cavity mode may facilitate quantum information processing by coupling the electronic orbital and spin states of the outer shell electrons of the metal ions in composition 600 to cavity photons, tuning the cavity mode, and coupling the cavity photons to some other metal ion electrons with different excitation energy (as such, the composition 600 may contain different species of metal ions). Thus, the semiconductor host of the composition 600 may be chosen or may be further doped to provide tunability of optical index of refraction. FIG. 6 illustrates one example of the power supply 614 and 616. Alternatively, the power supply may include involved electronics for controlling the timing, amplitude, and duration of the applied electric field. In addition, the application of the voltage may be coordinated or synchronized with the laser pulses used for exciting the electrons of the metal ions in the composition 600 to facilitate quantum information processing.

Figure 7A:
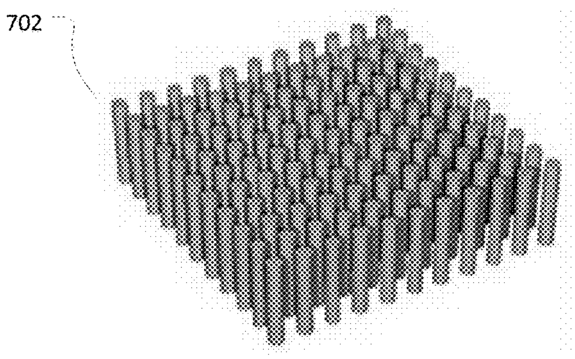
FIGS. 7A-7B illustrate other examples of optical elements that may be used in an optical quantum logic device comprising transition metal and semiconductor host composition.
Figure 7B:
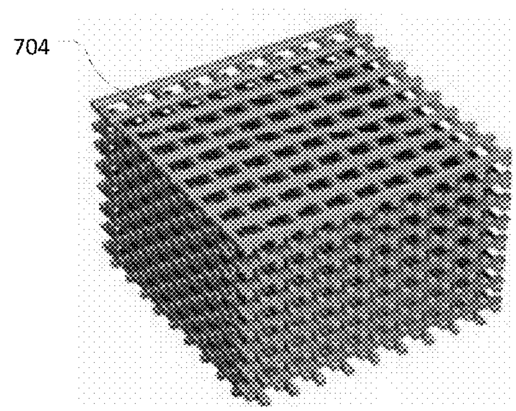
Figure 7C:
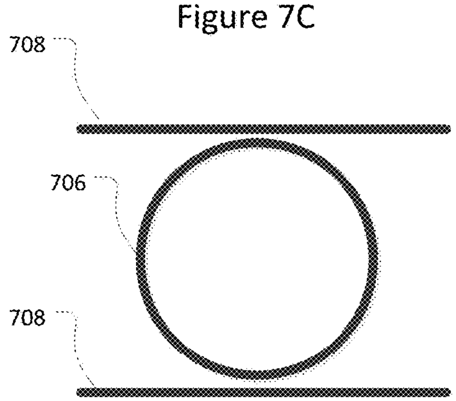
FIGS. 7C-7D illustrate other quantum logic device structures based on optical techniques comprising transition metal and semiconductor host composition.
Figure 7D:
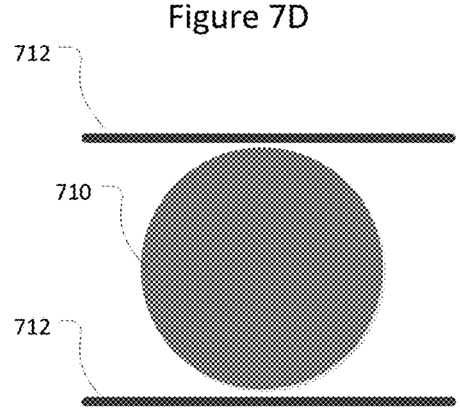

The Bragg reflectors 602 and 604 are merely one example of structures that may be used for forming the optical cavity. Bragg reflectors are a one-dimensional version of a general group of photonic crystal structures well known in the art. Other structures within the photonic crystal family of structures are contemplated, including the structures shown in FIGS. 7A and 7B. FIGS. 7A and 7B, respectively, show a 2D and a 3D photonic crystal that may be used to replace the Bragg reflectors 602 and 604 of FIG. 6. By 2D or 3D photonic crystal, it is meant that the reflector structure has periodicity (in optical index of refraction) in two or three spatial dimensions. These photonic crystal structures may be designed to reflect light of certain frequencies, similar to the Bragg reflectors discussed in FIG. 6. In addition, the semiconductor transition metal composition may be embedded into micro-resonators or other type of microcavity such as a ring resonator 706 and a microdisk resonator 710 of FIGS. 7C and 7D for implementation of quantum logic device. Waveguides 708 and 712 of FIGS. 7C and 7D are for coupling light in and out of the micro-resonators. The micro-resonator similarly support cavity modes as described above. In addition, the cavity mode may be tuned by electric field similar to the device of FIG. 6. In all the above implementations, the ground sate to excited state transition rather than the cavity mode may be turned by electric field based on Stark effect.

Incorporating the semiconductor and transition metal composition within high quality factor optical cavities may enable chip-scale, semiconductor-based implementations of optical quantum memories which include fully integrated optical, electronic, or magnetic control circuitry within the device. Potential optical quantum memory schemes include storage of light by Electromagnetically-Induced Transparency (EIT), the DLCZ protocol, Atomic Frequency Combs (AFC), Controlled Reversible Inhomogeneous Broadening (CRIB), and the off-resonant Faraday interaction.

Cavity-coupled ions may also enable spin-based storage of quantum information, spin-photon entanglement, and on-demand narrow-linewidth single photon sources. Spin-based storage of quantum information may take place within the ground state electronic spin or the spin of the ion nucleus. Spin-photon entanglement serves as the basis for entanglement swapping between remote quantum devices connected via an optical fiber, such as quantum repeaters in a distributed quantum network.

Figure 8:
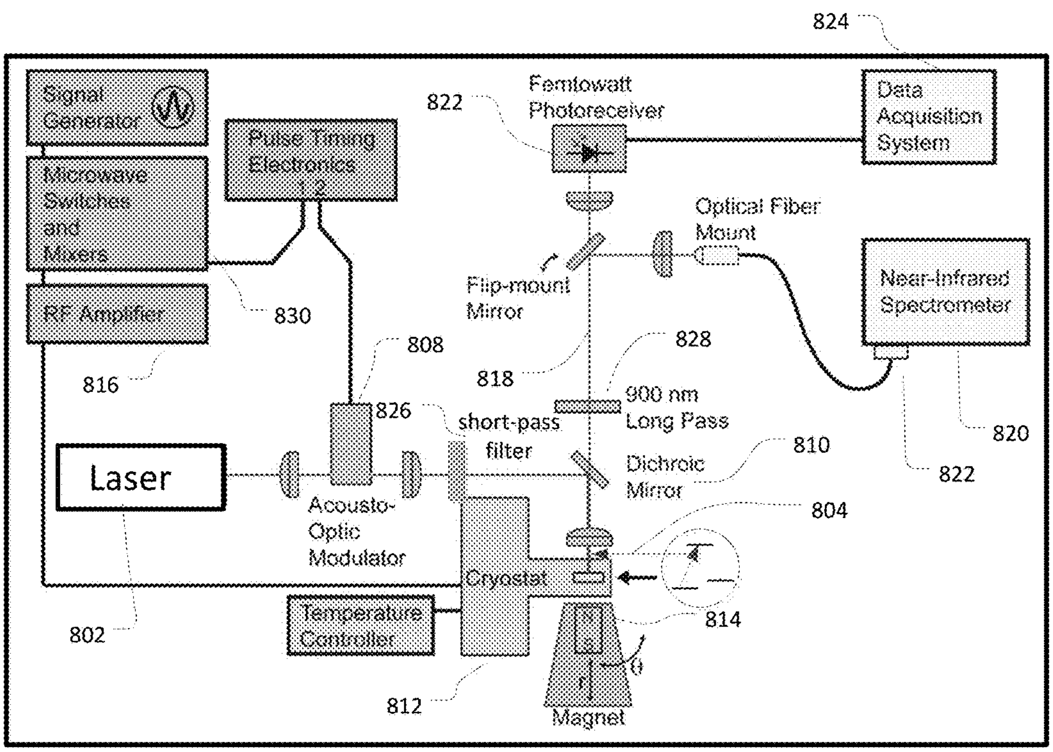
FIG. 8 illustrates examples of a setup for single color resonant excitation and measurement (Photoluminescence Excitation (PLE)) of a transition metal and semiconductor composition.

In exemplary implementations of the embodiments above, a semiconductor-transition metal composition is implemented as a ~0.5 $cm^2$ piece of chromium-doped 4H—SiC grown epitaxially on an off-axis, n-type 4H—SiC substrate, or as a 1.0 $cm^2$ freestanding bulk semi-insulating GaN substrate. 4H—SiC is a polytype, or unique crystal structure, of SiC in which the Si—C crystal planes are stacked in a pattern that repeats every four layers. 4H—SiC possesses a hexagonal crystal symmetry. The 4H—SiC:$Cr^{4+}$ epilayer was grown via high-temperature chemical vapor deposition (HTCVD) to a thickness of ~60 μm with a chromium density of $10^{15}$-$10^{16}$/$cm^3$. The GaN sample is 468 μm thick and was grown via hydride vapor phase epitaxy (HYPE). The GaN sample is doped with chromium and additionally compensation-doped with Fe3+ to pin the Fermi level near mid-gap during the growth process. Although the composition above was doped with a chromium density of $10^{15}$-$10^{16}$/$cm^3$, in other implementations, the chromium doping density may be of other values. For example, the chromium doping density may be between $10^{12}$-$10^{16}$/$cm^3$ Photoluminescence excitation (PLE) measurements may be taken to locate the energy levels of the chromium electrons by resonant excitation of ZPL. One implementation of PLE is illustrated in FIG. 8. For this implementation, a fiber-coupled external-cavity diode laser 802 with a tuning range of 1135-1175 nm and a linewidth of less than 200 kHz (measured over 50 ms) may be used to resonantly excite the chromium electrons from the ground states to excited states, as shown in FIG. 8. The phonon sideband emission 804 of the chromium ions may be collected as the electrons relax from the first excited state. The optical decay time of this relaxation is on the order of 100 μs. In one exemplary measurement, the laser is mode-hop free across the full tuning range, and at any given coarse wavelength setting has a fine-tuning range of ~60 GHz. The absolute value of the optical frequency of the laser may be monitored by a calibrated wavemeter. In PLE measurements, the amount of phonon side emission is recorded as a function the excitation laser frequency as it is tuned through the excited state resonances.

In some PLE implementations, the output of the fiber laser may be collimated and then passed through a free space acousto-optical modulator (AOM) 808 capable of digitally modulating the laser amplitude on or off. In some PLE implementation, a long-pass dichroic beam-splitter 810 with its cut-on edge tuned to ~1090 nm may be used to direct the laser through a 20 mm focal length lens and onto the SiC/Chromium or GaN/Chromium composition within focal spot diameter of ~30 μm. In one implementation, the excitation powers may be in the range of 5-10 mW. The SiC/Chromium or GaN/Chromium composition (herein referred to as the "composition") may be mounted in a liquid helium flow cryostat 812 with microwave and optical access. In some implementations, a motorized permanent magnet 814 may be mounted behind the cryostat and may be used to generate ≤2500 G magnetic fields along the c axis of the SiC or GaN crystal of the composition.

In some PLE implementations, a microwave driving fields 816 with an in-plane magnetic field component may be applied using an exemplary shorted coplanar waveguide placed behind the composition. This may advantageously allow electron spins oriented along the c axis of the SiC or GaN crystal to be driven efficiently.

In these PLE implementations, some fraction of the light absorbed by the composition is re-emitted within the phonon sideband 804, and this emission may be directed to collection optics and then focused into a multimode fiber 818. The multimode fiber may be connected to a spectrometer 820 having an InGaAs photodiode. Alternatively, the multimode fiber 818 may be connected to an InGaAs femtowatt photometer 822 for detection.

In one PLE implementation, data taken with the spectrometer may be post-processed in order to reject light not emitted within the spectral window of the phonon sideband. In some implementations, measurements taken with the femtowatt photodiode may be analyzed by a lockin amplifier 824 for which the excitation laser may be modulated at, for example, 973 Hz, using the AOM 808. In some implementation, laser scattering signal may be removed using appropriate short-pass and long-pass optical filters 826 and 828 placed in the excitation and collection beam-paths respectively. The locations of excitation and collection optical elements in FIG. 8 are only illustrative. The optical elements may be arranged in other configurations to achieve the same implementation.

In some PLE implementations, spin and optical dynamics of the chromium electrons may be time-resolved by employing a digital delay generator to handle the timing of the optical and microwave pulses. For the microwave pulses, a microwave switch 830 with a maximum switching time of 20 ns may be used to modulate the microwave signal on and off.

Figure 9:
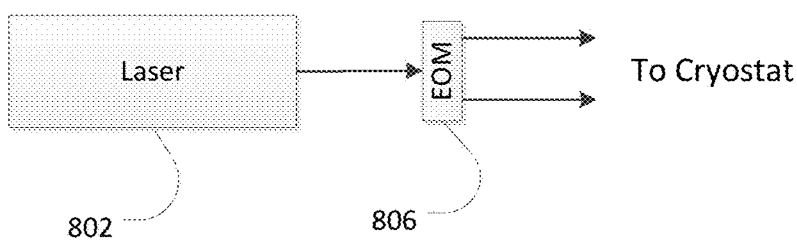
FIG. 9 illustrates an example of excitation setup for two color PLE implementation.

In another PLE implementation similar to the PLE implementation of FIG. 8, two-color rather than single-color excitation may be used. As illustrated in FIG. 9, for the two-color excitation measurement, the excitation laser beam may be further modulated by an electro-optic modulator (EOM) 806 capable of generating optical sidebands at $f_0 \pm n \cdot f_{EOM}$, where $f_0$ is the input laser optical frequency, $f_{EOM}$ is the phase modulation frequency of the EOM, and n is an integer. In one implementation, the magnitude of each pair of sidebands is determined by the driving amplitude of the EOM and decreases with n according to a Bessel function. Other aspects of the implementation of the two-color PLE are similar to single-color PLE of FIG. 8. In the two-color PLE implementation, the split ground states of the SiC or GaN and chromium composition are excited by the two colored laser beam.

Photoluminescence (PL) measurements may be further implemented using a setup similar to FIG. 8 except that the entire emission spectrum (both the emission from excited states to the ground states and the phonon sideband 804) is recorded by spectrometer 820 as the ions relax from the first excited state and the optical excitation is accomplished using a Ti:sapphire laser 802 tuned to an energy far above the first excited state. Appropriate long-pass filters 828 are placed in the collection path to eliminate laser scatter. The SiC or GaN composition is mounted in the cryostat similar to that the PLE implementation of FIG. 8. Other aspects of the PL implementation of FIG. 9 are similar to those of FIG. 8.

In some other implementation, optical absorption or emission by the spin triplet zero-phonon-lines (ZPLs) rather than the phonon sideband 804 is monitored. The absorption and emission of the spin-triplet ZPLs may be monitored as a function of time.

Figure 10:
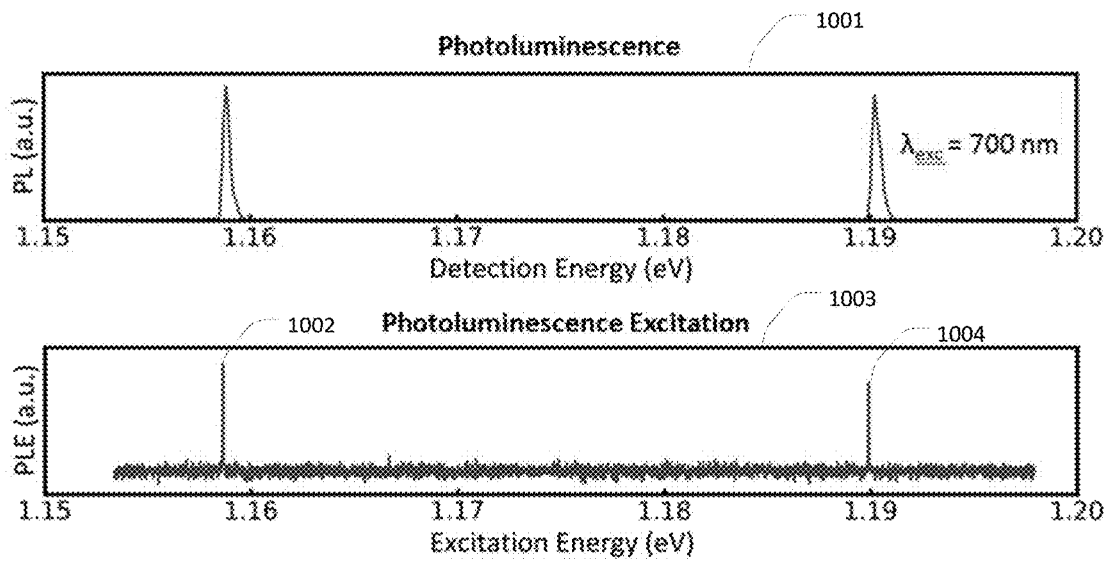
FIG. 10 shows the PL (upper graph) and PLE spectrum (lower graph) of a SiC:Cr composition.
Figure 11:
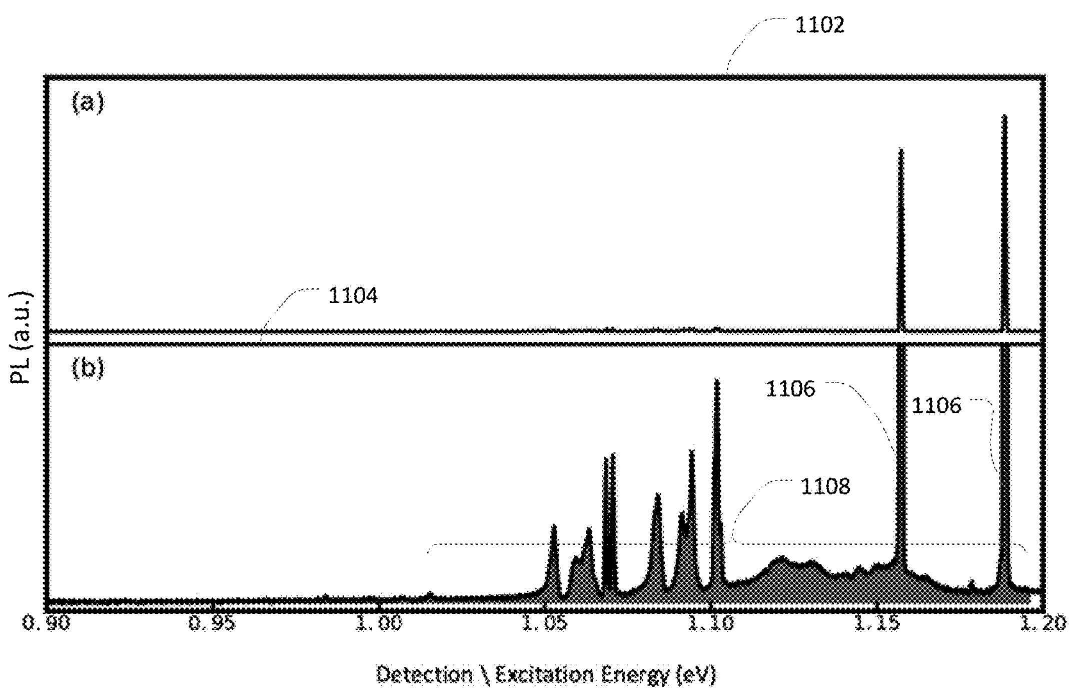
FIG. 11 shows the PL spectrum of a SiC:Cr composition highlighting its radiative efficiency.

FIG. 10 shows exemplary PL (1001) and PLE (1003) measurements from the 4H—SiC chromium composition at T=30 K and B=0 G (B represents the static magnetic field). Lines observed at 1042.1 nm and 1070.3 nm (1.1898 eV and 1.1584 eV) in the 4H—SiC:Cr4+ PLE measurement, 1002 and 1004, correspond to two different 4H—SiC crystal configurations as to the chromium ions ($Cr_A$, and $Cr_C$) and thus two separate sets of chromium ground sates and excited states with different resonance energies. The PL data 1001 is taken under non-resonant optical excitation. In another view of the PL data in 1102 of FIG. 11 from 4H—SiC chromium composition, a majority of the light emitted by the impurities is shown to be emitted in the ZPL. As further shown in the close up view of the same PL data in 1104, the PL emitted within the ZPLs only (1106), and all light emitted by the chromium impurities (1108) may be determined and their ratio may be used to represent the radiative efficiency, or fraction of defect luminescence emitted in the ZPL. The estimated radiative efficiency is 75% in this case.

Figure 12:
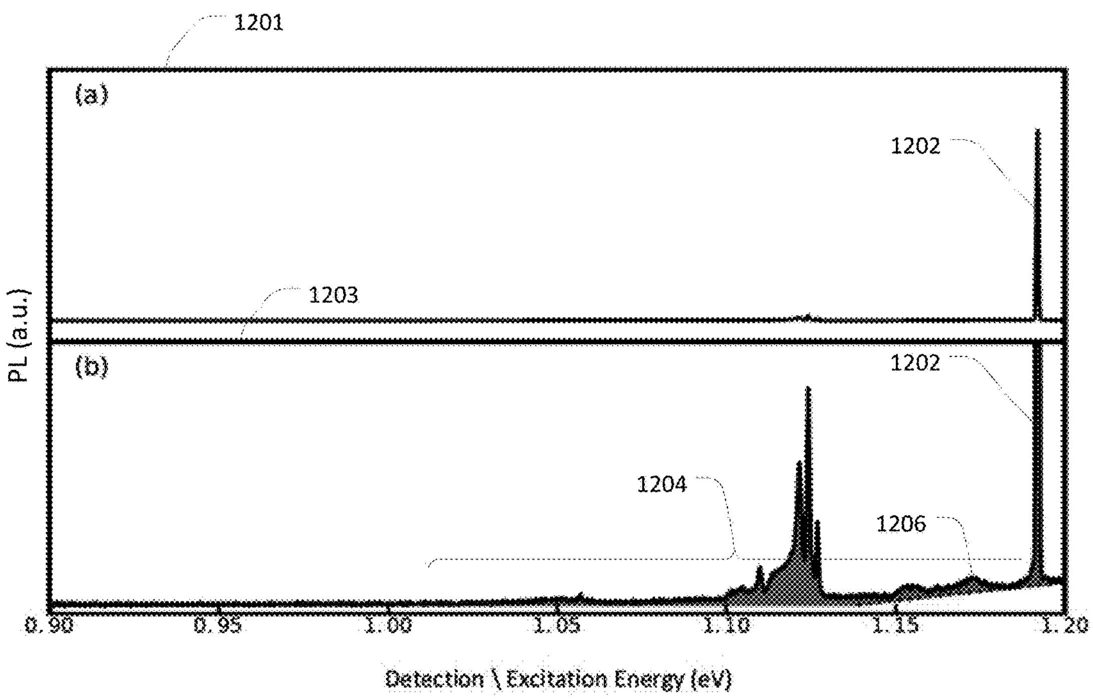
FIG. 12 shows the PL spectrum of a GaN:Cr composition highlighting its radiative efficiency.

In another exemplary measurement, PL measurement for a bulk GaN:Cr4+ was performed and shown in FIG. 12, similar to FIG. 1. PL spectrum 1201 of FIG. 12 shows that the majority of light emitted by GaN:Cr is emitted within the ZPL single peak PL 1202 at 1039.3 nm (1.193 eV) in bulk GaN:Cr4+. A close up view of the PL in 1201 is shown in 1203 of FIG. 12. Again, the ratio between the integrated light within the ZPL (1202) and all light emitted (1204) may be used to represent the radiative efficiency,or fraction of defect luminescence emitted in the ZPL for the bulk GaN: Cr4+. Evaluation of GaN:Cr4+ luminescence and radiative efficiency is complicated by the fact that it is situated on top of the low-energy tail of $Fe^{3+}$ luminescence, which was compensated for by approximating this tail as a straight line (the dotted line 1206), and determining the slope of this line by assuming that the base of the $Cr^{4+}$ ZPL feature should normally lie flat. With this approximation, it was determined that the ZPL contains 73% of the overall impurity luminescence, which is similar in magnitude to the result in 4H—SiC.

Figure 13A:
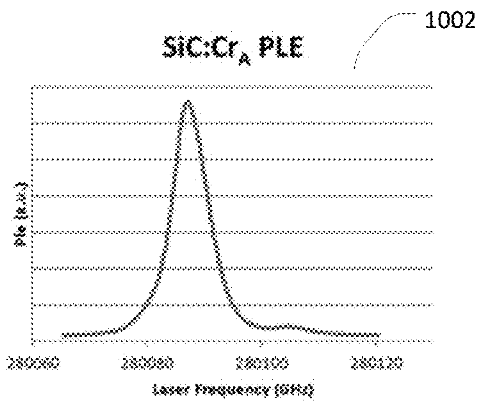
FIGS. 13A-13C shows fine PLE spectral scans of the corresponding peaks in FIGS. 10-12.
Figure 13B:
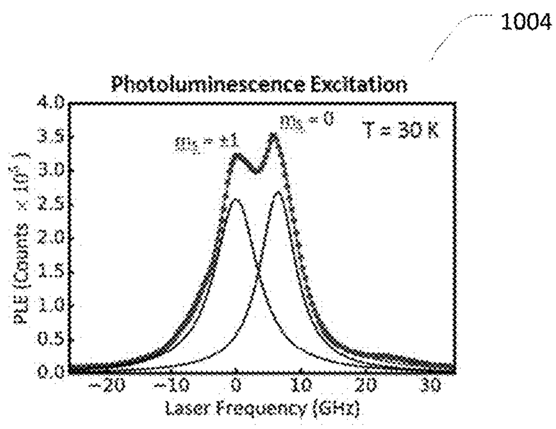
Figure 13C:
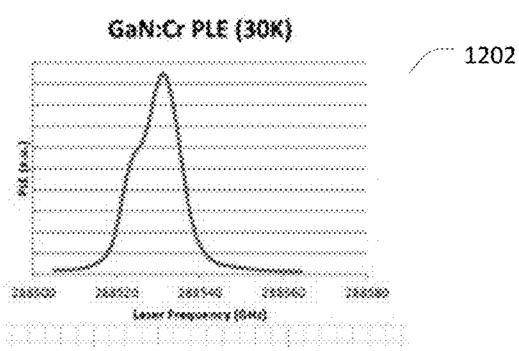

In another PLE implementation, fine frequency scans of the PLE peak 1002 and 1004 of FIG. 10 and a PLE scan over the PL peak 1202 of FIG. 12 are measured, as shown in FIGS. 13A, B, and C, respectively. A single maximum in the PLE signal is observed for the $Cr_A$ impurity in SiC (see FIG. 13A). Two maxima are clearly observed for both the $Cr_C$ impurity in SiC and the impurity in GaN (FIGS. 13B and 13C). In these two cases, each peak may be fit to a sum of two Lorentzians:

$$PLE(f) = \frac{A}{\pi}\left(\frac{\left(\frac{\Gamma}{2}\right)}{(f-f_0)^2+\left(\frac{\Gamma}{2}\right)^2}\right) + \frac{B}{\pi}\left(\frac{\left(\frac{\Gamma}{2}\right)}{(f-f_1)^2+\left(\frac{\Gamma}{2}\right)^2}\right) + C$$

where $f_0$ and $f_1$ (A and B) are the central frequencies (amplitudes) of the two Lorentzians, Γ is the full-width half maximum (FWHM) linewidth of both Lorentzians, and C is a constant to account for non-zero offset in the signal. For the SiC:$Cr_C$ defect, The curve fitting is shown in FIG. 13B and the linewidth of these features is Γ=7.42±0.07 GHz at 30 K and 0 G, with an energy splitting between the two maxima of (f0−f1)=6.46±0.03 GHz. For the GaN:Cr4+ ions, these values are Γ=8.28±0.14 and (f0−f1)=6.91±0.10. The energy splitting between the two peaks may correspond to the ground state zero-field spin splitting, e.g., the splitting between m=0 and m=±1 ground state spins sublevels, as shown in FIG. 4F.

Figure 14:
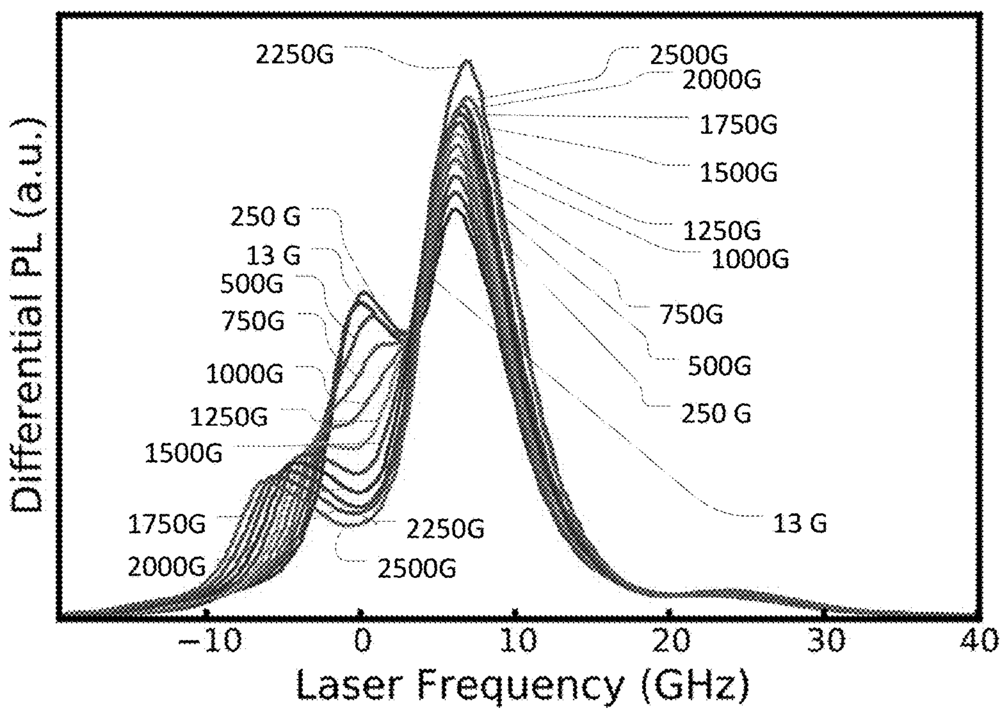
FIG. 14 illustrates the magnetic field dependence of the PLE peak for a SiC:$Cr_C$ composition.
Figure 15:
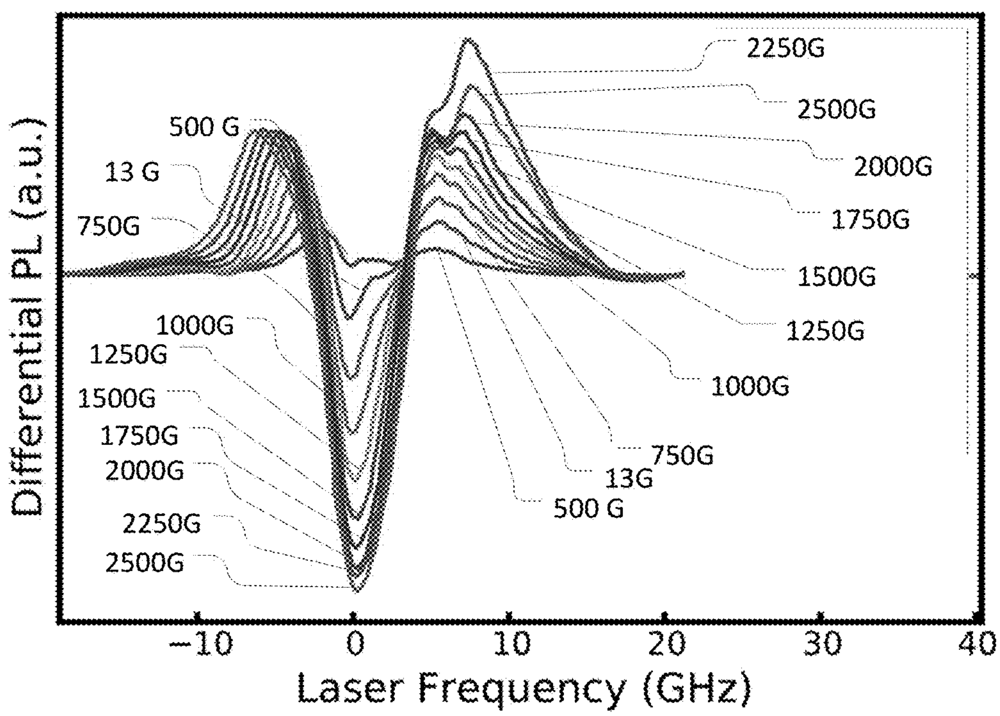
FIG. 15 illustrates another example of the magnetic field dependent PLE peak of FIG. 15.

In another PLE implementation, a static magnetic field is applied along the c axis of the crystal at 30 K. PLE for peak SiC:$Cr_C$ as a function of the magnetic field is illustrated in FIG. 14. The lineshape changes as the magnetic field is increased from 12-2500 G. The PLE data may be converted into a differential form in which the data at B=250 G is subtracted from each of the other PLE scan, as illustrated by FIG. 15. FIG. 15 further illustrates that as the magnetic field is first applied, a dip flanked symmetrically on either side before two small peaks begins to form. This dip is centered at the same frequency as the low-energy features in the 250 G PLE scan, and grows in magnitude as the magnetic field is increased. Similarly, the two peaks on either side not only grows in magnitude with magnetic field, but also appear to move slowly outward away from the dip. This is the expected field-dependent behavior for an optical transition that links two degenerate m=±1 spins sublevels to a common excited state. Under the application of a magnetic field, two degenerate optical transitions begin to split apart in energy according to the Zeeman effect. Note that no signal related to the S=0 sublevel is detected in the differential data since its energy remains unchanged by the magnetic field.

Figure 16:
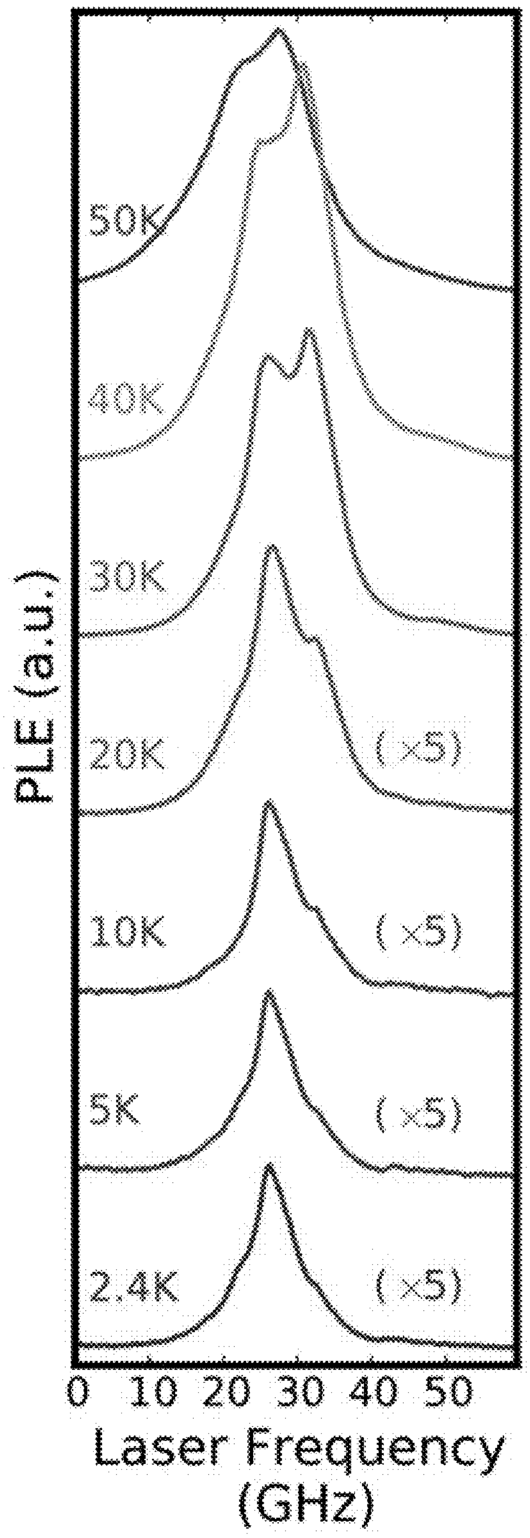
FIG. 16 illustrates a temperature dependent PLE of a SiC:$Cr_C$ composition.

In another PLE implementation, the temperature may be lowered to below 30 K, as illustrated in FIG. 16. The magnetic field may be kept at 0. FIG. 16 illustrates that as the sample temperature is lowered below 30K, the overall magnitude of the PLE signal decreases substantially as a result of increasing spin lifetime of the ground state. In addition, the relative magnitude of the low-frequency and high-frequency features within each scan increases. The first observation suggests that as the spin lifetime of the ground state increases with decreased temperature, the ion electron spin may be polarizing. That is, if each ion is a lambda system (FIG. 4F) where a single excited state (S=0) is coupled optically to two non-degenerate ground states ($m_s$=0 vs. $m_s$=±1), then selective optical excitation of one ground state will tend to pump the system into the other. If the decay rate between the two ground states is low, then the ions will go dark since the latter state is not resonant with the laser. Thus, the resonant laser in this PLE implementation prepares an ensemble of Cr ions into a polarized spin ensemble.

Figure 17:
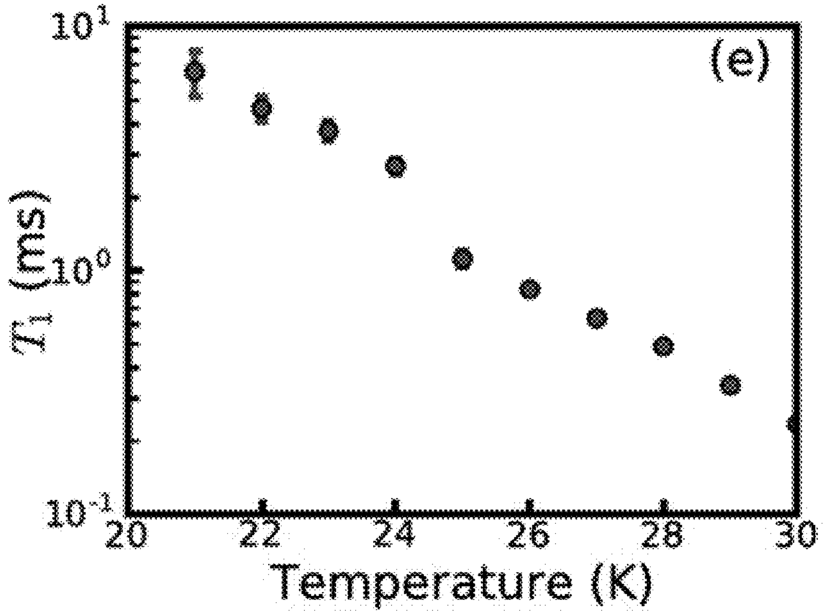
FIG. 17 illustrates temperature dependence of the spin-lattice relaxation time for a SiC:$Cr_C$ composition.
Figure 18:
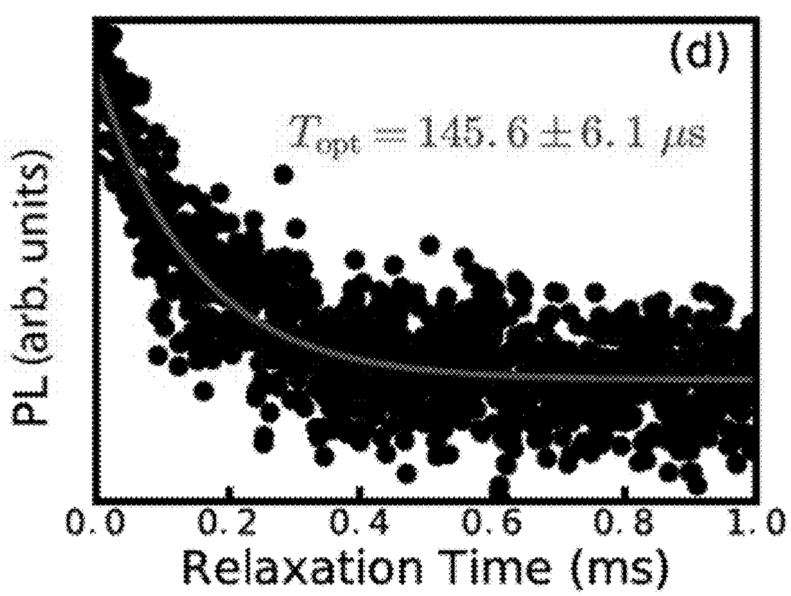
FIG. 18 illustrates the optical delay time for a SiC:$Cr_C$ composition.

In another PLE implementation, the spin behavior can be characterized more precisely at lower temperatures using optical spin polarization. According to the level structure of FIG. 4F, selective optical excitation of one ground state spin sublevel with a narrow-linewidth laser will pump the system into another sublevel via resonant excitation followed by spontaneous emission. A polarized ion will then remain dark and inaccessible to the laser until a spin-flip occurs. A measured spin-lattice relaxation time $T_1$ as a function of temperature is shown in FIG. 17. To measure $T_1$, the ensemble is first pumped into the $m_s$=±1 sublevels, using a 500 μs long resonant laser pulse. After waiting for a predetermined time τ, the degree of remaining spin polarization is measured optically using a second 500 μs long laser pulse. The spins are then allowed to relax fully for 25 ms before the pulse sequence is repeated. At each value of τ, the pulse sequence is repeated for several seconds while PLE emission is collected. These measurements can be compared to the optical relaxation time $T_{opt}$ of the ions measured at T=20K, and as shown in FIG. 18. Specifically, the optical relaxation time $T_{op}$ is measured by exciting the ensemble with a non-resonant laser pulse and then monitoring the PL that follows as a function of time. Again, this measurement is repeated for several seconds to build up sufficient signal. As shown in FIG. 17, at temperatures below ~30 K, the spin-lattice relaxation time $T_1$ of the $Cr_C$ ions becomes much longer than the optical relaxation time $T_{opt}$. This results in a substantially reduced PLE signal at these lower temperatures (FIG. 16), due to the long-lived optical spin polarization within the subensemble of ions excited by the laser.

Figure 19:
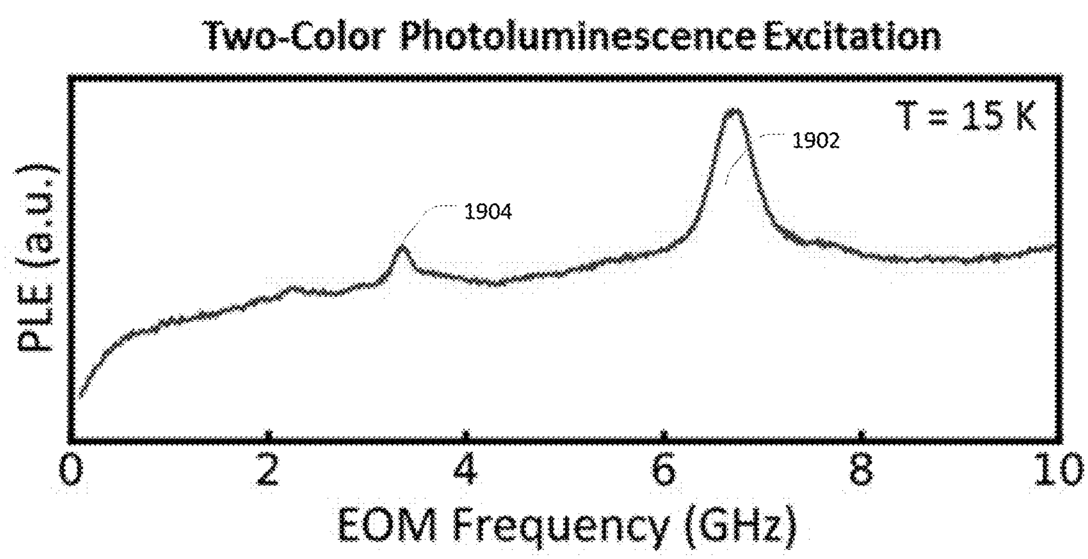
FIG. 19 is a two-color PLE spectrum for a SiC:$Cr_C$ composition.

In yet another PLE implementation, two-color excitation based on FIGS. 8 and 9 is used. By modulating the EOM with a microwave signal, optical sidebands on the laser emission with a separation of 0-10 GHz from the fundamental laser tone are generated. The fundamental laser tone may be set to the higher energy PLE maximum associated with the m=0 optical transition. Because the defect spins are polarized through resonant optical excitation by the fundamental layer tone, the overall PLE signal increases when the sideband frequency $f_{EOM}$=D, the zero-field splitting of the ground state spin (around 6.71 GHz), as illustrated by peak 1902 of FIG. 19. The peak 1904 in FIG. 19 at 3.37 GHz is caused by the second harmonic laser sidebands generated by the EOM and corresponds to the same excitation laser frequency as the peak 1902. The linewidth of the peak at 6.71 GHz is much narrower (<1 GHz) than the overall linewidth of the PLE resonances characterized earlier at 30 K (~7 GHz). In the two-color PLE implementation above, only a subpopulation of the overall ensemble is excited and the linewidth of peak 1902 is determined by factors such as laser linewidth, laser jitter, and spectral diffusion within the defect ensemble.

Figure 20:
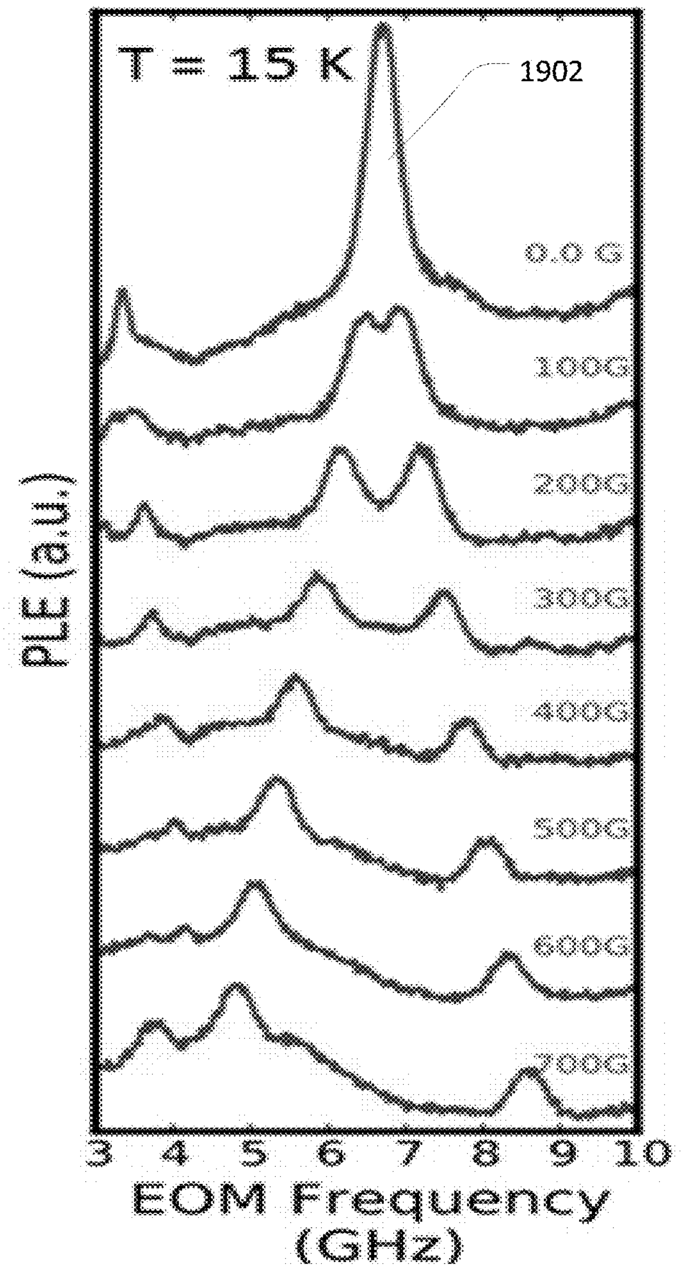
FIG. 20 illustrates a magnetic field dependence of a two-color PLE spectrum for a SiC:$Cr_C$ composition.
Figure 21:
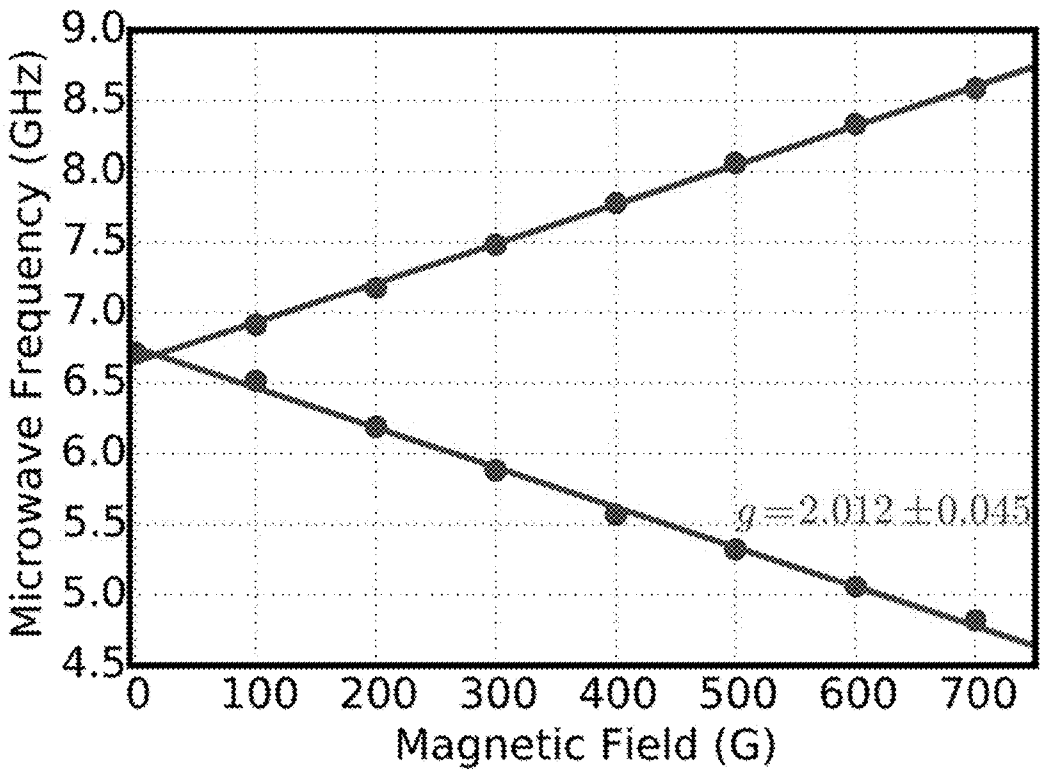
FIG. 21 illustrates Zeeman splitting of the electron spin ground states of a SiC:$Cr_C$ composition.

In a further implementation of two color PLE, magnetic field is applied. The peak 1902 of FIG. 19 split into two Zeeman split peaks with increasing magnetic field, as illustrated by FIG. 20. The position of these two peaks are shown in FIG. 21. The two peaks split with a g-factor of approximately 2. The resonance features in FIG. 20 represent a recovery of luminescence that occurs when the two laser colors/tones are resonant with the two optical transitions simultaneously. The features observed indicate that individual defects within the ensemble have become spin polarized through resonant excitation, as shown in more detail below.

Figure 22:
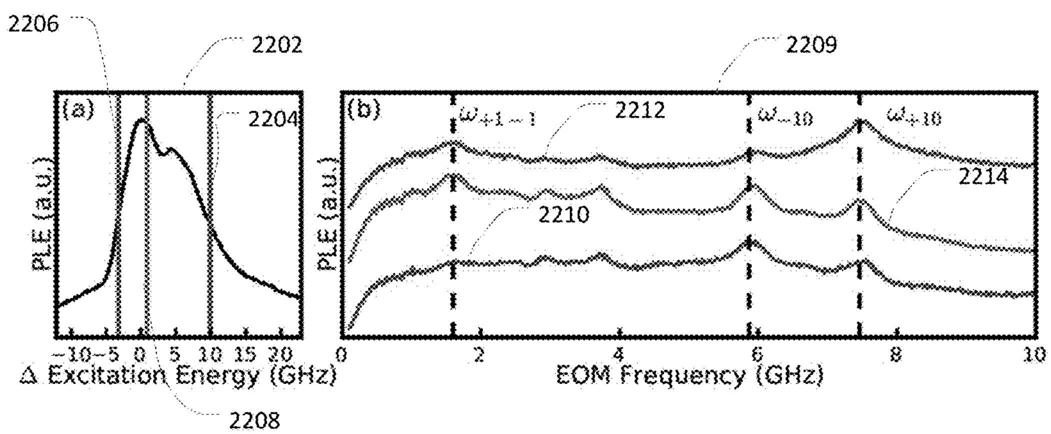
FIG. 22 illustrates ensemble spin polarization in a SiC:$Cr_C$ composition.

In another PLE implementation and as shown in FIG. 22, the application of a static magnetic field where one fraction of the ions dominates over the others can generate an overall spin polarization of the ensemble via optical pumping. Exemplary PLE measurements collected from 4H—SiC:$Cr_C$ ions at T=15K and B=289 G via scanning a single laser line across the ZPL transitions of the ion ensemble show two peaks that correspond to the $m_s$=0 (right peak of 2202 of FIG. 22) and $m_s$=±1 (left peak of 2202 of FIG. 22) spin sublevels of the $Cr_C$ ions, where the three vertical lines drawn on top of the data in 2202 of FIG. 22 are from three different laser excitation frequencies. The vertical lines 2204 and 2206 corresponding to frequencies where the majority of the ions resonant with the laser are excited via $m_s$=0 and $m_s$=+1 optical transitions, respectively. The vertical line 2208 corresponds to an energy where some ions are excited via an $m_s$=0 optical transition, some via $m_s$=+1, and some via $m_s$=−1. At each of the frequencies designated by the vertical lines 2204, 2206, and 2208 in FIG. 22, and under the same temperature and magnetic field conditions, a two-color excitation experiment was performed (2210, 2212, and 2214 of 2209 of FIG. 22, respectively corresponding to 2204, 2206, and 2208 of FIG. 22, with data offset vertically for clarity). Features seen in 2210 of FIG. 22 at $\omega_{-10}$, and $\omega_{+10}$ demonstrate that optically polarized spins are being pumped primarily out of the $m_s$=0 sublevel into $m_s$=±1 sublevels, generating a net spin polarization. A third feature at $\omega_{-+1-1}$ in the 2214 of FIG. 22 indicates that spins within this sub-ensemble are being pumped out of the $m_s$=±1 sublevels as well. All three features are also seen in 2212 of FIG. 22, but the magnitude of the feature $\omega_{+10}$ is larger than that at $\omega_{-10}$. This indicates that spins within this sub-ensemble are being pumped primarily out of the ms=+1 sublevel into the $m_s$=±1 and $m_s$=0 sublevels, again generating a net spin polarization.

Figure 23A:
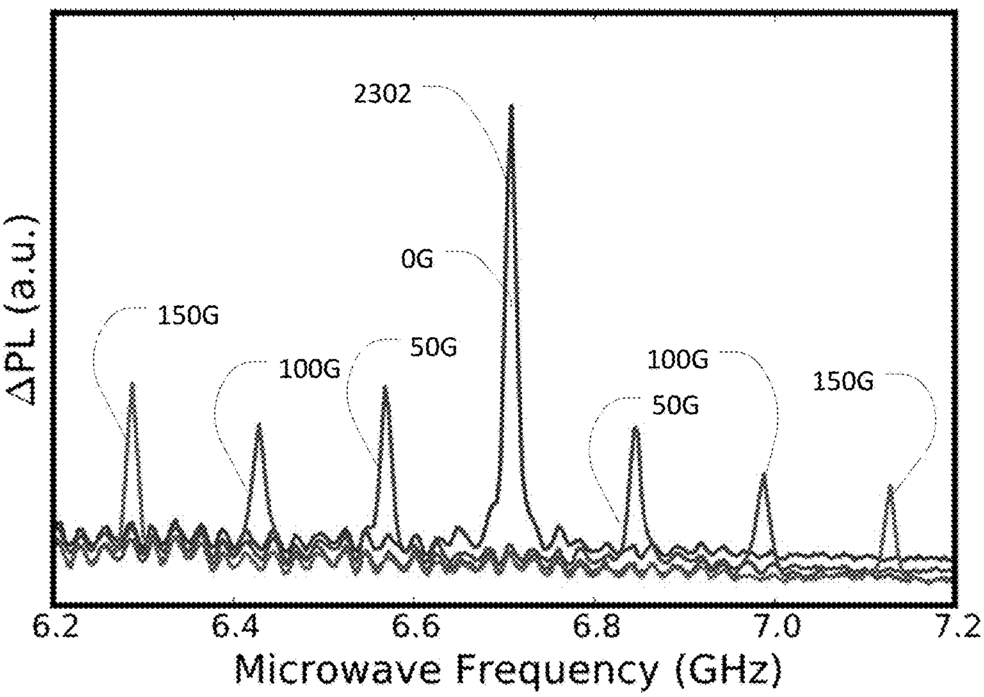
FIGS. 23A-23B illustrates optically induced magnetic resonance of a SiC:$Cr_C$ composition.
Figure 23B:
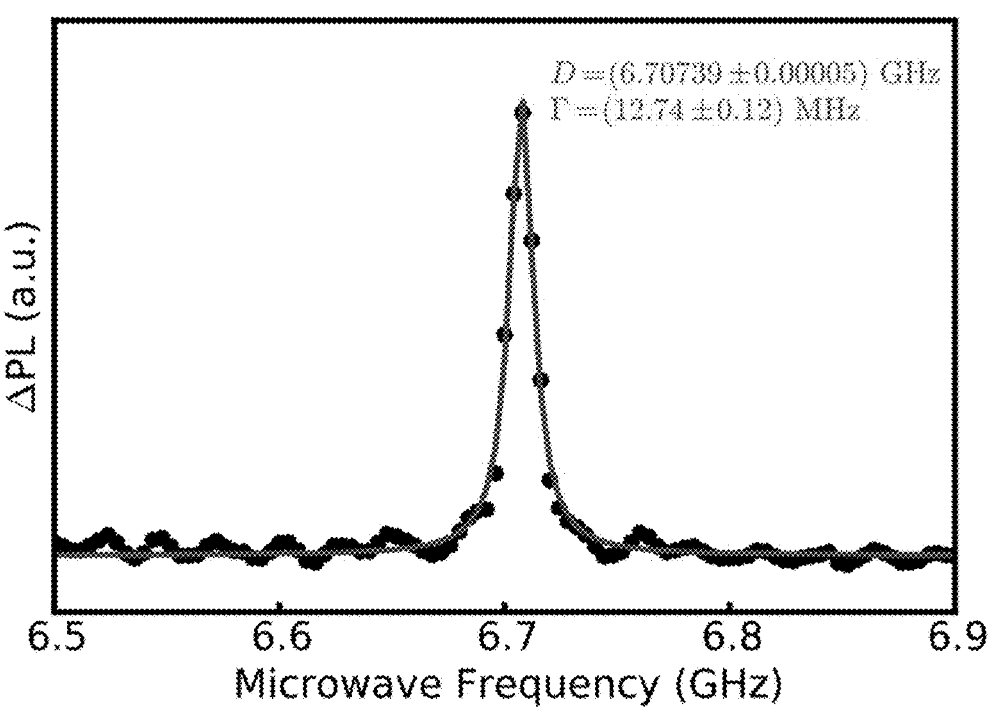

In another PLE implementation, SiC:$Cr_C$ composition is excited by the laser at B=0 G and T=15 K with a single optical frequency tuned to the center of the m=0 optical transition. An additional continuous microwave excitation is tuned between 0-10 GHz while the PLE data is collected. As illustrated by 2302 in FIG. 23A, a resonance feature is observed, centered at f=6.707 GHz, representing a optically detected magnetic resonance between the ground spin states that split at zero magnetic field. The magnetic resonance has a linewidth of approximately 13 MHz, corresponding to an inhomogeneous spin relaxation time of 25 ns, as shown by the line fitting in FIG. 23B. FIG. 23A further illustrates the magnetic field dependence of the optically detected magnetic resonance. FIG. 23A show a Zeeman splitting consistent with FIG. 21.

Thus, as discussed above, there are many potentially advantageous characteristics of the transition metal ion systems implemented above. Optical excitation occurs at wavelengths compatible with optical fibers (in particular, at near-infrared wavelengths near the transmission window of silica fiber). Optical linewidths are narrow with few radiative loss mechanisms due to weak phonon coupling. The ions exist within common semiconductors for which established growth and microfabrication techniques exist. The nuclear spin bath surrounding the ions may be tailored for specific applications through isotopic engineering and material selection. The nuclear spin of the ion can be tailored depending on choice of ion species or isotope. Chromium ions, for instance can have nuclear spin 0 or 3/2.

Parameters that can be tuned or varied within these systems include the ion impurity concentration (in order to tune optical absorption characteristics and spin lifetime), Fermi energy (i.e., electron or hole doping density), and crystal strain. As mentioned previously, the nuclear profile of the host or ion species can be tuned through materials selection or isotopic engineering. Other transition metal ions with a d2 electron configuration in a strong tetrahedral crystal field environment may exhibit similar physical characteristics. As mentioned above, ions with a d8 electron configuration in a strong octahedral crystal field environment may also behave similarly. Ions can be incorporated within a given semiconductor host through ion implantation or through direct doping during growth. An annealing step may be performed to activate implanted ions.

While the particular invention has been described with reference to illustrative embodiments, this description is not meant to be limiting. Various modifications of the illustrative embodiments and additional embodiments of the invention, will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A quantum information processing device comprising:

at least one optical element;

a semiconductor crystal composition comprising a multi-hedral semiconductor crystal host with a multi-hedral coordination geometry; and non-rare earth transition metal ions having a d-N electron orbital configuration, wherein the non-rare earth transition metal ions substitute at a corresponding plurality of crystal sites of the semiconductor crystal host;

wherein a crystal field of the semiconductor crystal host splits the d-N electron orbitals of the non-rare earth transition metal ions into lower energy orbitals and higher energy orbitals with a crystal field splitting;

wherein the lower energy orbitals are further split by electron spin pairing energy forming at least two ground states and at least one excited state;

wherein the crystal field splitting is larger than the spin pairing energy; and wherein the at least one optical element is configured to interact with the semiconductor crystal composition for quantum information processing using optical excitations resonant with an optical transition involving the ground states and the excited state.

2. The device of claim 1, wherein the multi-hedral semiconductor crystal host comprises a tetrahedral semiconductor crystal host.

3. The device of claim 2, wherein the tetrahedral crystal host is a silicon carbide crystal.

4. The device of claim 2, wherein the tetrahedral crystal host is a gallium nitride crystal.

5. The device of claim 1, wherein the semiconductor crystal host is silicon and the transition metal ions comprise tungsten ions or molybdenum ions.

6. The device of claim 1, wherein the non-rare earth transition metal ions comprises at least one of chromium, vanadium, tantalum, niobium, molybdenum, tungsten, zirconium, and hafnium ions.

7. The device of claim 1, wherein the multi-hedral crystal host is an octahedral semiconductor crystal host.

8. The device of claim 1, wherein the non-rare earth transition metal ions substitute the multi-hedral semiconductor crystal sites at a density of $10^{13}$-$10^{16}$ per cubic centimeter.

9. The device of claim 1, wherein the at least one optical element comprises an optical microcavity configured to at least partially enclose the semiconductor crystal composition.

10. The device of claim 9, wherein the optical microcavity comprises a pair of Bragg reflectors.

11. The device of claim 9, wherein the optical microcavity comprises photonic crystals.

12. The device of claim 9, wherein the optical microcavity comprises an optical microresonator.

13. The device of claim 9, wherein the optical microcavity has at least one cavity mode that overlaps spectrally with a transition involving one of the at least two ground states of the non-rare earth transition metal ions.

14. The device of claim 9, wherein the microcavity has at least one cavity mode tunable to be resonant with a transition involving one of the at least two ground states of the non-rare earth transition metal ions.

15. The device of claim 9, wherein the microcavity comprises at least two cavity modes, wherein one and the other of the at least two cavity modes respectively overlap with one and the other of two transitions involving the at least two ground states and the at least one excited state of the non-rare earth transition metal ions.

16. In a quantum information processing device comprising a multi-hedral semiconductor crystal host with a multi-hedral coordination geometry in which each of a plurality of lattice sites of the semiconductor crystal host are substituted with a non-rare earth transition metal ion having d-N electrons, a method for quantum information processing, comprising:

exciting the non-rare earth transition metal ions with coherent optical fields resonant with at least one optical transition involving at least one electronic ground state and at least one excited state of the non-rare earth transition metal ions;

wherein the non-rare earth transition metal ions substitute at a corresponding plurality of crystal sites of the semiconductor crystal host;

wherein a crystal field in the semiconductor crystal host splits orbitals of the d-N electrons of the non-rare earth transition metal ions into lower energy orbitals and higher energy orbitals by a crystal field splitting;

wherein the lower energy orbitals are further split by electron spin pairing energy forming the at least two ground states and the at least one excited state; and wherein the crystal field splitting is larger than the spin pairing energy.

17. The method for quantum information processing according to claim 16, wherein a quantum information processing device further includes an optical microcavity at least partly enclosing the multi-hedral crystal host with the non-rare earth transition metal substitutes.

18. The method for quantum information processing according to claim 17, wherein the optical microcavity comprises a pair of Bragg reflectors.

19. The method for quantum information processing according to claim 17, wherein the optical microcavity comprises photonic crystals.

20. The method for quantum information processing according to claim 17, wherein the optical microcavity has at least one cavity mode that overlaps spectrally with a transition involving one of the at least two ground states of the non-rare earth transition metal ions.

21. The method for quantum information processing according to claim 20, wherein the cavity mode of the optical microcavity is configured to be tunable; and further comprising:

tuning the cavity mode of the optical microcavity to be resonant with the transition involving one of the at least two ground states of the non-rare earth transition metal ions.

22. The method for quantum information processing according to claim 20, wherein the transition involving the at least two ground states of the non-rare earth transition metal ions is tunable in energy using an electric field.

23. The method for quantum information processing according to claim 16, wherein a quantum information processing device further includes an optical microresonator having at least one resonant frequency.

24. The method for quantum information processing according to claim 23, wherein the at least one resonant frequency of the optical microresonator overlaps spectrally with a transition involving the at least two ground states of the non-rare earth transition metal ions.

* * * * *